April 2, 1968 V. J. KORKOWSKI 3,376,563

DISCRIMINATION, LOGIC AND MEMORY DEVICES EMPLOYING A TRANSFLUXOR CORE

Filed April 1, 1964 2 Sheets-Sheet 1

INVENTOR

Vincent J. Korkowski

BY Moore, Hall & Pollock

ATTORNEYS

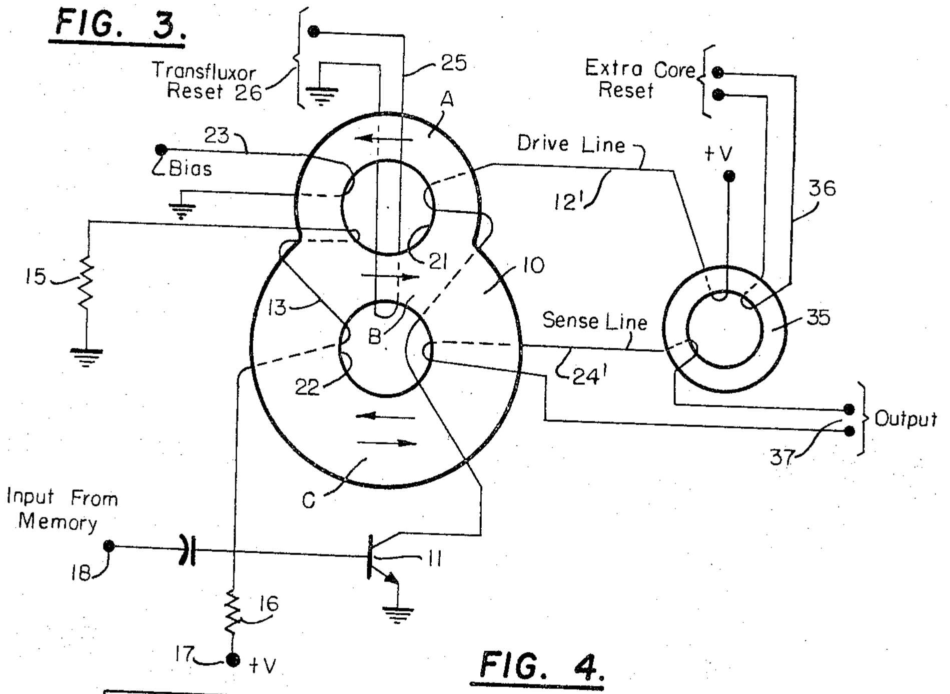
FIG. 3.

FIG. 4.

| | X<N<Y | Transfluxor 10 | Extra Core 35 |
|---|---|---|---|
| Search Sequence | 1. X<N, "Yes" | B And C Switch | Core Switches |
| | 1a. X<N, "No" | A And B Switch | Core Does Not Switch |
| | 2. Tr'xor Reset | Resets | Does Not Reset |
| | 3. N<Y, "Yes" | A And B Switch | Core Does Not Switch |
| | 3a. N<Y, "No" | B And C Switch | Core Switches |
| Readout Cycle | 4. Drive Both Reset Lines | Resets To Quiescent | Resultant Output Produced Only If X<N<Y |

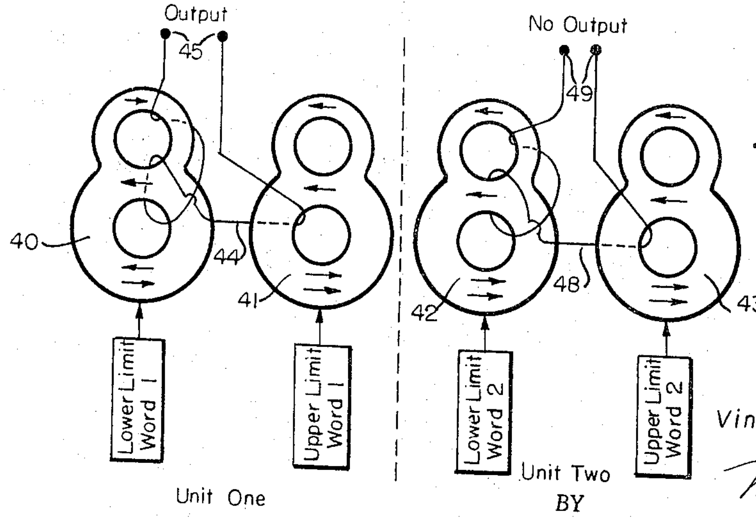
FIG. 5.

INVENTOR
Vincent J. Korkowski
BY
Moore, Hall & Pollock
ATTORNEYS

United States Patent Office 3,376,563
Patented Apr. 2, 1968

3,376,563

DISCRIMINATION, LOGIC AND MEMORY DEVICES EMPLOYING A TRANSFLUXOR CORE

Vincent J. Korkowski, Minneapolis, Minn., assignor to Sperry Rand Corporation, New York, N.Y., a corporation of Delaware Filed Apr. 1, 1964, Ser. No. 356,478
14 Claims. (Cl. 340—174)

ABSTRACT OF THE DISCLOSURE

A triggerable blocking oscillator incorporating a transfluxor as the saturable feedback transformer core, which core is adapted to achieve first and second different magnetic stable states, different from a quiescent stable state, upon the application of a first one of a positive-going or of a negative-going input signal, respectively.

As is known to those skilled in the art, a Search memory is an arrangement of storage elements in which a plurality of words of data are stored. The array of storage elements thus provided is normally associated with an external register adapted to hold a word being searched for; and upon the application of a search command to the device, an indication is given, or a signal produced, indicative of whether or not the word being searched for its stored in the memory. Systems of this general type, suggested heretofore, have normally been relatively complex in design and have normally required relatively elaborate controls. As a result, they have normally been relatively expensive in nature and have nevertheless had limited utility. By way of example, devices suggested heretofore have, in some cases, been adapted to perform searches of only a particular type; and if the type of data processing being effected contemplates that different types of searches might have to be effected, various different detector arrangements were provided for these searches. Moreover, the complexity of such systems suggested heretofore have, in many cases, required special coupling arrangements between the search memory and encoder systems normally associated therewith, since detectors of the types suggested heretofore have, in many instances, not been compatible with conventional encoder systems.

The logic and detector device of the present invention, when used in a Search memory application, obviates all of these problems. It employs fewer components than have been considered necessary heretofore, thereby decreasing maintenance problems and also decreasing expense of the equipment. Moreover, as will become apparent, the device of the present invention is much simpler in design, and requires simpler controls, than has been the case heretofore; is, moreover, compatible with conventional encoder systems; and is adaptable for a variety of different types of searches. When employed in Search memory applications, therefore, the detector of the present invention represents a significant improvement over detectors utilized for such purposes heretofore.

In its broader aspects, the device of the present invention represents a significant improvement over detector devices and triggerable blocking oscillators suggested heretofore. As will become apparent, the device, in its basic form, comprises a two-aperture transfluxor associated with a single transistor, and so arranged that, upon application of an input signal, the device may be triggered from a predetermined static or quiescent flux condition into either of two different stable flux conditions dependent respectively upon the polarity of the input signal supplied. While magnetic core and transistor combinations have been suggested heretofore for use as blocking oscillators, the present invention is distinguished from such prior suggestions in the particular and highly improved winding arrays that are employed to interconnect the transfluxor and its associated transistor. These arrays, as will become apparent, provide advantages of simplicity of design and required control, lesser expense, et cetera, as described previously. Moreover, the ability of the device to respond to signals of either of two polarities to switch into either of two distinct stable states differing from the quiescent state results in the device exhibiting a highly useful function of polarity discrimination, something which many prior circuits have been incapable of, notwithstanding their greater complexity, cost, et cetera.

It is accordingly an object of the present invention to provide an improved Search memory logic and detector device.

Another object of the present invention resides in the provision of a Search memory detector device that is compatible with conventional encoder systems, whereby it may be employed in computer and data processing applications of known configurations without requiring extensive redesign or the provision of special coupling circuits.

Another object of the present invention resides in the provision of a magnetic core-transistor arrangement of improved, highly simplified, and less expensive design than has been the case heretofore.

A further object of the present invention resides in the provision of a highly improved triggerable blocking oscillator adapted to respond to input trigger signals of either of two opposing polarities, and adapted to switch from a quiescent condition into either of two different stable states dependent upon the polarity of the trigger pulse applied.

Still another object of the present invention resides in the provision of an improved transistor-transfluxor circuit adapted to perform discrimination, logic, and memory functions.

A still further object of the present invention resides in the provision of an improved match logic detector for Search memory applications adapted to perform greater-than, less-than, equal to, and between limits searches; and further capable of performing these different functions in an apparatus that is much simpler in design and in required control than has been the case heretofore.

In providing for the foregoing objects and advantages, the device of the present invention, in its basic form, comprises a two-aperture transfluxor coupled to a single transistor by means of a winding array consisting, inter alia, of two wires each of which threads both apertures in opposite magnetic sense respectively. In addition, a bias winding is provided in association with one only of said apertures; and reset as well as output windings are provided in such an overall configuration that the device acts as a triggerable blocking oscillator.

More particularly, the transfluxor is capable of assuming a quiescent or normal state characterized by particular flux directions at various different portions thereof. The winding array interconnecting the transfluxor and transistor is such that, upon occurrence of an input signal, portions of the transfluxor switch from the aforementioned quiescent flux condition into a different stable state characterized by different flux directions. This switching is accomplished in such manner that, once the transfluxor portion mentioned starts to switch, a regenerative action takes place, thereby ensuring that the device fully switches into its new stable state. The actual state into which the transfluxor is so switched depends upon the polarity of the input signal supplied, with the device being capable of assuming either of two different stable states, other than the quiescent state, in response to input signals of different relative polarity. If a subsequent read-out operation is effected, therefore, either of two different signals may be produced, depending upon the relative polarity of the input signal originally employed to trigger the device out of its quiescent condition.

In its broadest aspects, therefore, the device is one capable of assuming any of three different stable flux states in response to the presence (or absence) as well as in response to the polarity, of an input signal; and such a tristable device finds ready utility in a variety of applications wherein it is desired to determine whether or not a signal is present, and wherein it is further desired to determine what the polarity of a signal is when a signal is present. The sensitivity of the device to different relative polarity input signals, moreover, makes the device readily usable as a reliable, inexpensive, logic device. One possible such application is in a Search memory, where the device may be employed to detect and store the first (considered the most significant) of a series of output signals from a driven memory word, for determination of word compliance with a search criterion. Possible applications of the device in such an environment will be described more fully hereinafter.

The foregoing objects, advantages, construction and operation of the present invention will become more readily apparent from the following description and accompanying drawings, in which:

FIGURE 3 is a schematic diagram illustrating how the detector device of FIGURE 1 may be associated with a further core to perform a between-limits search in a Search memory;

FIGURE 4 is a tabulation setting forth a possible search sequence, and the results thereof, for the arrangement shown in FIGURE 3; and FIGURE 5 is an illustrative representation of a plurality of elements constructed in accordance with the present invention and arrayed to perform a second type of between-limits search.

Figure 1:
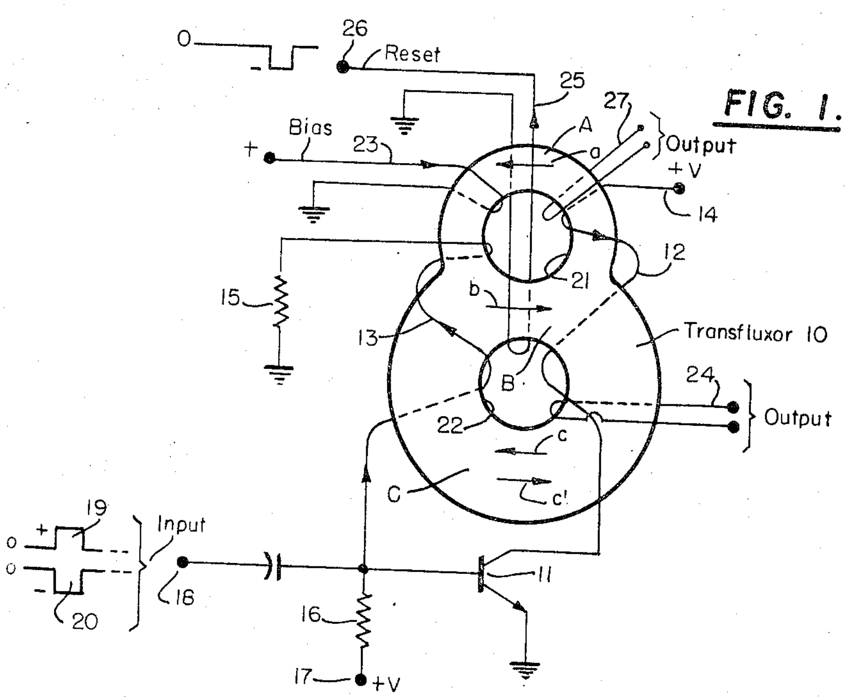
FIGURE 1 is a schematic diagram of a transistor-transfluxor arrangement constructed in accordance with the present invention.

Referring now to FIGURE 1, it will be seen that a device constructed in accordance with the present invention, and operating in the manner described previously, comprises a transfluxor 10 and a transistor 11 electrically interconnected to one another by means of a pair of windings 12 and 13. Winding 12 is coupled at one of its ends to a source of positive potential 14 having a magnitude $+V$ while the other end of said winding 12 is coupled to a transistor 11 as illustrated. Winding 13, which functions essentially as a feedback or regenerative winding, as will appear, is coupled at one end via a resistor 15 to ground and is coupled at its other end to the base of transistor 11, with the junction being in turn coupled by a further resistor 16 to $+V$ source 17. The base of transistor 11 is further capacitively coupled to an input terminal 18 adapted to receive trigger signals which may be either of positive-going polarity (as at 19) or of negative-going polarity (as at 20); and, as will appear, the transfluxor 10 is adapted to assume either of two different stable states, other than its quiescent state to be described, in response to either positive-going or negative-going signals 19 and 20.

Transfluxor 10 comprises a magnetic material preferably exhibiting a substantially rectangular hysteresis loop. It is characterized structurally by the provision of two apertures designated 21 and 22, respectively; and the two apertures are so disposed that transfluxor 10 exhibits three legs designated respectively A, B and C. Leg A is termed the reference area, and it is approximately equal in cross-sectional area to leg B. The cross-sectional area of leg C is approximately twice that of the reference area A.

In the initial or quiescent condition of the circuit, the direction of flux in the legs A, B and C, is as indicated respectively at the arrows *a, b, c, c'*. Certain of these flux directions may be altered in response to inputs applied to terminal 18; and as will appear more fully hereinafter, the several flux directions shown in FIGURE 1 may be altered to those shown in FIGURE 2A in response to an input triggering signal of positive-going polarity, and the various flux directions shown in FIGURE 1 may be altered to those shown in FIGURE 2B in response to a negative-going input trigger signal.

In addition to the elements thus far described, the device further includes a bias winding 23 coupled to aperture 21 alone; an output winding 24 coupled to aperture 22 alone, i.e., to leg C only, whereby outputs are produced only when leg C switches; and a reset winding 25 adapted to receive reset signals at a terminal 26, said reset winding 25 being coupled to both of legs A and B in the arrangement illustrated.

Transistor 11 is biased so as to be normally conductive; and in the static or quiescent condition of the device illustrated in FIGURE 1, steady state transistor current flows through the winding 12 in the direction illustrated. Winding 12 couples through both of apertures 21 and 22 in the same magnetic sense; and the static transistor current flowing therethrough normally tends to effect flux in a counter-clockwise direction about each of the two apertures. It should be noted that, for purposes of relating the B–H loops of FIGURES 1A and 1B with the circuit as viewed from the side shown in FIGURE 1, such a counter-clockwise direction of flux has been arbitrarily treated as having been produced by a positive MMF. Bias winding 23, also coupled around aperture 21, tends to effect an MMF in a clockwise direction about aperture 21, i.e., in a direction opposing the flux direction produced by that portion of winding 12 that links aperture 21; and, accordingly, the actual flux direction in leg A is determined by the resultant or combined effects of the opposing MMFs produced by windings 12 and 23 relative to aperture 21. The bias field produced by winding 23 is selected to exceed that normally produced by that portion of winding 12 that links aperture 21 whereby a resultant negative MMF is impressed upon the portion of transfluxor 10 associated with aperture 21.

Figure 1A:
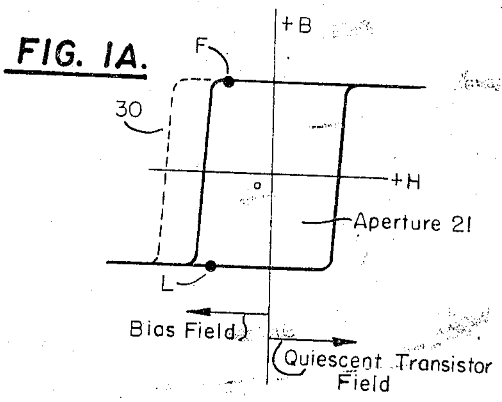
FIGURES 1A and 1B are representative hysteresis loops for the two apertures of the transfluxor shown in FIGURE 1, illustrating the operation of the device shown in FIGURE 1.

This particular aspect of the static operating condition in transfluxor 10 is illustrated in FIGURE 1A, which depicts the B–H loop for aperture 21. It will be noted that the bias field and quiescent transistor field produced respectively by windings 23 and 12 are illustrated as being in opposition to one another with the bias field predominating; and aperture 21 may accordingly be considered to operate at a point F when the device is in its quiescent state.

Figure 1B:
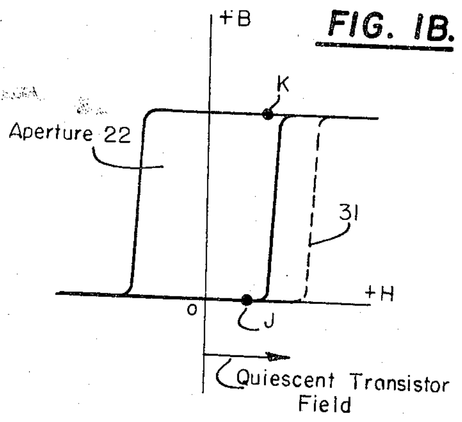

The situation with respect to that portion of transfluxor 10 that is associated with aperture 22 differs from that described previously. This different situation is illustrated by the B–H loop of FIGURE 1B. The quiescent condition of of the device is such that leg C actually carries flux in two opposing directions designated respectively C and C'; and, insofar as the B–H loop of aperture 22 is concerned, the flux density is zero as illustrated in FIGURE 1B. Aperture 22 is linked by winding 12, but is not linked by the bias winding 23. The MMF produced by the quiescent transistor current in winding 12 causes aperture 22 to operate at the point J as illustrated in FIGURE 1B.

Let us now assume that a positive-going trigger pulse, such as is illustrated at 19, is applied to terminal 18. It will be recalled that transistor 11 is already conducting; and application of a positive-going signal thereto causes this conduction to increase. The MMF produced by current flow through winding 12 accordingly increases with respect to both of the portions of transfluxor 10 that are associated with apertures 21 and 22 respectively. The increasing MMF produced by the portion of winding 12 associated with aperture 21 in effect imposes a resultant positive MMF on leg A. This will, transiently, tend to shift the operating point F (see FIGURE 1A) in a positive direction, but the flux direction *a* in leg A will not be altered, nor will leg A switch. The increasing MMF in a positive direction produced by the portion of winding 12 associated with aperture 22 will, however, tend to switch aperture 22 from its operating point J (see FIGURE 1B) to a new operating point K. As the flux about aperture 22 is being switched, a positive signal will simultaneously be induced in winding 13 at the base of transistor 11; and the action of the device accordingly becomes regenerative with transistor 11 conducting even harder due to the initial increase in its current. This blocking oscillator action continues until such time as all the flux about aperture 22 has been switched, at which time the flux change in winding 13 will cease; and since it is assumed that the input signal 19 is no longer present, the transistor 11 will return to a quiescent current condition. At this time, therefore, aperture 22 will be at a new operating point K (see FIGURE 1B), and, in addition, the flux directions in legs B and C will have been altered relative to reference area A, in the manner illustrated by FIGURE 2A.

Figure 2A:
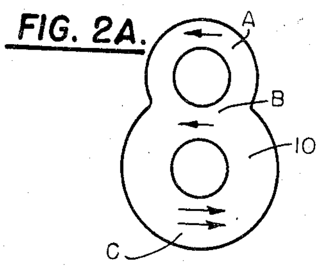
FIGURES 2A and 2B are illustrative representations of the circuit shown in FIGURE 1 depicting the different stable flux states that are achieved by the device of FIGURE 1 in response to positive-going and in response to negative-going trigger pulses, respectively.

From the foregoing, it will be appreciated that a positive-going input pulse such as 19 causes legs B and C to switch; and this switching is effected by a blocking oscillator type action that continues until a new stable state, depicted by FIGURE 2A, has been achieved. It should further be noted that this new flux state of the transfluxor, after the preceding has occurred, is accompanied by a resultant shift in the B–H loop of aperture 21. This has been depicted, illustratively, in FIGURE 1A, by the dotted representation 30. More particularly, the switch in flux direction in leg B now blocks flux from leg A whereby leg A, if it is to switch, must now switch about a much longer path, i.e., about leg C. This consideration effectively extends the loop, as indicated at 30 in FIGURE 1A. Subsequent input signals, of such an amplitude as to cause switching from the quiescent state, will not be able to exceed the newly established switching threshold and the circuit will remain "locked out" until such time as the device is readout.

Read-out, when it is to be effected, is accomplished by applying a negative-going pulse to terminal 26 of reset winding 25. Winding 25 links both of legs A and B; and it will be noted that the direction of linking is such as to tend to effect flux in the particular directions *a* and *b* indicated in FIGURE 1. Upon applying such a reset pulse to terminal 26 (assuming a positive-going trigger had been applied previously to terminal 18), the directions of flux in legs B and C must switch from those shown in FIGURE 2A to those shown in FIGURE 1; and this is accompanied by a flux change through output winding 24, thereby producing an output signal.

Let us now assume that the transfluxor 10 is again in its quiescent condition, as depicted in FIGURE 1, and let us further assume that a negative-going input signal 20 is applied to terminal 18. Such a negative-going input signal 20 tends to decrease the current in transistor 11, and accordingly decreases the current flowing through winding 12. The MMF produced by the part of winding 12 linking aperture 21 accordingly decreases, whereby current flowing in bias winding 23 starts to switch the direction of flux about aperture 21. Concurrent with this switching, and as a result of the flux change effected thereby, a negative signal is induced in winding 13 and applied to the base of transistor 11, causing transistor 11 to conduct even less. A regenerative or blocking oscillator action thus again takes place, continuing until such time as all the flux about aperture 21 has been switched. The flux directions are then as depicted in FIGURE 2B; and once the transfluxor reaches this different stable flux state, the transistor 11 returns to its static or quiescent condition.

Aperture 21 will now have been shifted from the operating point F to a new operating point L. Moreover, for reasons similar to those discussed previously, the leg C, if it is to be switched, must now be switched about a longer path (path C–A); and this effectively extends the B–H loop for aperture 22 as indicated at 31. Subsequent input signals, therefore, will once more be unable to exceed the newly established switching threshold; and the circuit will remain "locked out" until such time as the device is read-out. Read-out would, as in the example previously described, be effected by again applying a proper potential or signal to reset winding 25. Since the output winding 24 links only leg C, reset in the circumstances illustrated in FIGURE 2B will not effect a flux change through the output winding; and accordingly, reset will not produce an output signal in winding 24. It will be appreciated, however, that the output winding 24 shown in FIGURE 1 is not the only winding that can be provided; and additional windings such as winding 27, could be provided in association with aperture 21 together with or in place of winding 24, depending upon the particular utilization to be made of the device.

Figure 2B:
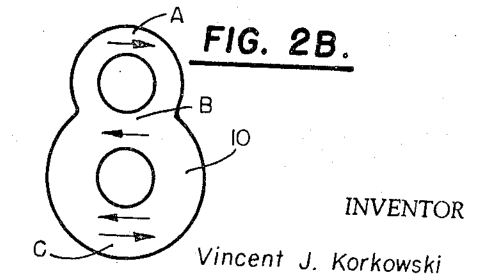

As will be apparent from the foregoing, and from a comparison of FIGURES 1, 2A and 2B, the overall circuit is such that transfluxor 10 is adapted to exhibit any of three stable flux states, corresponding to the presence (or absence) as well as tc the polarity of input triggering signals. The ability of the circuit to operate in this manner makes it very useful in a wide variety of logic applications, particularly since it is reliable, relatively inexpensive, and uses relatively few components. One possible such application for a device of the type shown in FIGURE 1 is in a Search memory where the device may be used to detect and store output signals from a driven memory word, for determination of word compliance with a search criterion. To facilitate the search function, the circuit of FIGURE 1 may be modified in the manner shown in FIGURE 3, i.e., may be modified to include an extra core associated with a sense winding adapted to be coupled to address encoders.

The circuit of FIGURE 3 is much the same as that already described in reference to FIGURE 1; and to the extent that the circuits are the same, like numerals have been used in FIGURE 3. Winding 12 is, however, designated 12′ in FIGURE 3 since, as will appear, it acts not only in the manner already described, but acts also as a drive line for an auxiliary core 35. Similarly, the output winding 24 of FIGURE 1 has been designated 24′ in FIGURE 3 since it acts as a sense winding in cooperation with the extra core 35. Lines 12′ and 24′ link extra core 35 in the manner depicted in FIGURE 3; and, in addition, a further winding 36 is provided in association with core 35 for selectively resetting said core 35.

The overall circuit shown in FIGURE 3 may be utilized as a detector in performing a between-limits search. A possible search sequence has been tabulated in FIGURE 4; and this search sequence, as well as a possible read-out cycle, will be described more fully hereinafter. As a practical matter, the performance of the between-limits search requires two programmed search operations. In the first search, the search register contains bits representing the lower limit; and a greater-than match is specified. In the second search, the search register contains bits representing the upper limit; and a less-than match is specified. The two search operations could, of course, be performed in reverse sequence.

If we assume that the detector, e.g., as illustrated in FIGURE 3, is associated with a memory word lying between the specified limits, we can further postulate that a greater-than condition can be utilized to apply a positive-going input signal to the detector, whereas a less-than condition can be used to apply a negative-going input signal. In the first, or greater-than search, a positive signal will increase transistor current causing the direction of flux about aperture 22 to switch; and the resultant current change in drive line 12′ linking core 35 will also cause extra core 35 to switch. Prior to the second search, the transfluxor is reset to its initial state; as will appear, this does not reset extra core 35. A negative-going output generated during the second or less-than search will again switch the direction of flux, this time about aperture 21, but the extra core 35 will be unaffected. Note, in this respect, that the sense line 24′ connects aperture 22 and extra core 35, but excludes aperture 21. Upon completion of the search, the transfluxor 10 and extra core 35 are both reset to their initial state. The output induced in sense winding 24′ by the extra core 35 during this time (in the absence of a cancelling output from aperture 22) may then be applied to address encoders for encoding the address of the memory word complying with the search criterion.

A typical sequence, generally of the type described above, is tabulated in FIGURE 4. It will be noted that the search sequency includes two search operations designated respectively 1–1*a* and 3–3*a*, separated by a resetting of the transfluxor 10. In the first search operation, a determination is made as to whether or not the significant bit, designated N, is greater than a predetermined lower limit X. If it is (example 1), a positive signal is applied to terminal 18 of FIGURE 3, thereby causing legs B and C of transfluxor 10 to switch, as described in reference to FIGURES 1 and 2A. The increasing current in transistor 11 produces an MMF in core 35 causing that core to switch. On the other hand, if during this first search operation, it is determined that the bit N is not greater than the lower limit X (example 1*a*), then a negative signal is applied to terminal 18. For this condition, legs A and B of transfluxor 10 switch, as described in reference to FIGURES 1 and 2B; and extra core 35 does not switch. Accordingly, during this first or greater-than search sequence, extra core 35 is caused to switch only if the bit N exceeds the lower limit X.

After the first search operation 1–1*a* has been completed, the transfluxor 10 is reset by driving winding 25. Regardless of whether example 1 or 1*a* had been present, the resetting or transfluxor 10 does not reset core 35; and accordingly, core 35 remains in its switched condition if it was so switched during the first search operation. A second search sequence, designated 3–3*a*, is then effected to determine whether or not the bit N is less than the upper limit Y. If it is (example 3), a negative signal is applied to terminal 18 causing legs A and B of transfluxor 10 to switch. If the second search criterion is met (example 3) core 35 remains in its set or switched condition. On the other hand, if during the second search sequence, it is found that the bit N exceeds the upper limit Y (example 3*a*), a positive signal is applied to terminal 18, causing legs B and C of transfluxor 10 to switch, and also increasing the current in drive line 12′, thereby causing extra core 35 to switch.

As will be apparent from the foregoing description of the search sequence, therefore, core 35 will switch and be caused to remain in its switched condition if the bit N is greater than the lower or upper limits X and Y (examples 1 and 3, respectively).

A read-out cycle, designated 4 in FIGURE 4, is then effected by driving both of the reset lines 25 and 36 associated with transfluxor 10 and extra core 35, respectively. During this read-out cycle, three possible conditions might occur. In the first condition, let us assume that the bit N does fall within both the lower and upper limits. Application of a resetting signal to winding 36 will accordingly reset core 35 so as to produce an output at 37 indicative of this condition. It should be noted, in this respect, that application of a resetting signal to winding 25 of transfluxor 10 will merely restore legs A and B of the transfluxor 10 to their quiescent flux state without effecting any flux change through the part of sense line 24′ linking leg C.

As a second possible read-out circumstance, let us assume that, during the first search sequence, situation 1*a* had been encountered, i.e., that bit N did not exceed the lower limit X. In this situation, the core 35 would not have been switched, whereby application of a resetting pulse to winding 36 will not produce any output signal due to any resetting of core 35. Similarly, it will be noted that, for this particular assumed condition, leg C of transfluxor 10 would not have been switched; and accordingly resetting of transfluxor 10 would not at that time induce any potential in the portions of winding 24′ linking leg C. Accordingly, for this second situation, no output is produced at terminals 37.

The third possible condition which could occur during the read-out cycle corresponds to item 3*a* of the search sequence, i.e., that the bit N exceeds the upper limit Y. In this circumstance, it will be noted that legs B and C of transfluxor 10 were switched and that, moreover, core 35 was also switched. Accordingly, during the read-out cycle, when both of reset lines 25 and 36 are driven, legs B and C will switch as will core 35; and there will, accordingly, be a flux change through the portion of sense line 24′ which links leg C as well as through that portion of sense line 24′ which links core 35. The various winding and core parameters for elements 10, 24′ and 35 are so chosen, however, that, in this situation, the voltage induced in winding 24′ by the flux change in leg C will be equal and opposite to that induced in said winding 24′ by the flux change in core 35. The two voltages will, accordingly, cancel one another, producing a resultant output of zero, i.e., no output, at terminals 37.

As will be noted from the foregoing, a resultant output signal appears at terminals 37 only if the memory word, with which the detector of FIGURE 3 is associated, lies between the specified limits X and Y. This output, when it occurs, can then be applied to address encoders for encoding the address of the memory word complying with the search criteria.

It will be appreciated that the type of search described in reference to FIGURES 3 and 4 represents only one possible search mode; and variations will be suggested to those skilled in the art. One possible such variation contemplates the performance of a between-limit search involving the use of a pair of adjacent words in the Search memory as a single unit. In this mode, one word contains the upper limit while the other word contains the lower limit; and the search determines if the magnitude of the word in the search register falls within the limits specified by the pair of memory words. FIGURE 5 illustrates a detector array, utilizing the detectors of the present invention, for performing a search of this type.

The array of FIGURE 5 comprises a pair of units associated respectively with the aforementioned pair of adjacent words in the Search memory. One such unit utilizes a pair of detectors 40 and 41 whereas the second such unit comprises a further pair of detectors 42 and 43. Each of the detector units 40, 41, 42 and 43 corresponds in structure and operation to the detector already described with reference to FIGURE 1, except that the output winding 24 of FIGURE 1 is now replaced by a new winding array interconnecting the several units 40 through 43 inclusive in such manner as to effectively AND the detectors together. Thus, units 40 and 41 are interconnected by a winding arrangement 44 effectively ANDing the detectors 40 and 41 together, and operative to selectively produce an output at terminals 45 if the search criteria are met. Similarly, detector units 42 and 43 are ANDed together by a winding 48 associated with output terminals 49. A between limits search utilizing the aforementioned pair of adjacent words can be performed; and upon completion of the search, each of the detectors 40 through 43 inclusive are simultaneously reset to their initial state. At this time, the AND is satisfied and an output is sent to the encoder, only by that unit whose limits comply with the word in the search register. In the particular example illustrated in FIGURE 5, it has been assumed that such an output is produced at terminals 45 by the first unit.

While I have thus described preferred embodiments of the present invention, many variations will be suggested to those skilled in the art, and certain of these variations have in fact been described. It must, therefore, be understood that the foregoing description is intended to be illustrative only and should not be considered limitative of my invention; and all such variations and modfiications as are in accord with the principles described are meant to fall within the scope of the appended claims.

Having thus described my invention, I claim:

1. In a signal detector, a transfluxor comprising a magnetic core having at least three legs, a signal source, winding means on said core comprising a first winding for applying a variable magnetomotive force of a first magnetic sense to two of said legs and a second winding for applying a fixed magnetomotive force of a second magnetic sense, opposite to said first magnetic sense, to only one of said legs, current means responsive to the presence and absence as well as to the polarity of signals from said source for variably energizing said first winding to set the relative flux directions in said legs into a selected one of at least three distinct stable states, a third winding responsive to flux changes in said core due to changes in the energization of said first winding for controlling the output of said current means, and output means for determining which of said three stable flux states has been established in said legs.

2. A detector device comprising a magnetic core having first, second, and third legs at least two of which differ in cross-sectional area from one another, normally conductive amplifier means, energizing winding means coupled to the output of said normally conductive amplifier means for establishing flux in said legs in first relative directions to one another, signal means coupled to said amplifier means for selectively increasing and decreasing said normal amplifier current to switch the flux direction in selected ones of said legs thereby to establish either second or third relative flux directions in said legs differing from one another and from said first relative directions in dependence upon whether said normal amplifier current has been increased or decreased respectively, an output winding on said core, and reset means operative subsequent to operation of said signal means for re-establishing said first relative flux directions in said legs thereby to selectively produce a flux change in said output winding producing an output signal characteristic of the relative flux directions in said legs resulting from operation of said signal means.

3. A detector device comprising a transfluxor having a plurality of spaced flux-carrying portions, normally conductive amplifier means, winding means coupling the output current of said normally conductive amplifier means to said transfluxor for establishing flux in said spaced portions in first relative directions to one another, signal means selectively producing signals in either of two opposite-going senses for selectively increasing and decreasing the normal output current of said amplifier, said winding means being operative to switch the flux directions in first portions of said transfluxor in response to an increase in said amplifier current and being operative to switch the flux directions in second portions of said transfluxor in response to a decrease in said amplifier current, and first and second output winding means coupled to said first and second transfluxor portions, respectively, for selectively producing an output indicating the absence or presence and sense of a signal from said signal means.

4. A detector device comprising a transfluxor having a pair of spaced apertures defining first, second, and third legs, said first and second legs having substantially the same cross-sectional area, and said third leg having a cross-sectional area substantially equal to the combined cross-sectional areas of said first and second legs, a transistor biased to be normally conductive, first winding means coupling said transistor to both said pair of spaced apertures in a first same magnetic sense respectively whereby the normal transistor current operates to effect flux in first relative directions in said first, second, and third legs, second winding means coupling a control electrode of said transistor to both said pair of spaced apertures in a second same magnetic sense respectively opposite to said first magnetic sense, whereby a change in said normal transistor current effects a flux change in said transfluxor inducing a voltage in said second winding means tending to maintain said change in transistor current until new stable relative flux directions different from said first directions are effected in two of said first, second and third legs, bias winding means coupled to said transfluxor adjacent said first aperture only for producing a magnetomotive force about said first aperture different in magnitude from and in a sense opposite to the magnetomotive force produced adjacent said first aperture by said first winding means, and input means for coupling signals to said control electrode of said transistor operative to selectively increase and to selectively decrease said normal transistor current whereby the relative flux directions in said legs may be selectively altered into either of two different stable flux directions which differ from one another as well as from said first relative directions.

5. The device of claim 4 including at least one output winding linking one only of said legs for producing an output signal in response to flux changes in said one leg.

6. The device of claim 5 wherein said output winding links said third leg only.

7. The device of claim 6 including a further magnetic core linked by portions of said first winding means and by a portion of said output winding, whereby the said further core is selectively switched in response to predetermined signals from said input means, and means for selectively testing the magnetic state of said further core for producing a control signal only when said further core has been switched into a predetermined magnetic condition.

8. The device of claim 7 including separately operable reset winding means coupled to both said transfluxor and to said extra core respectively for selectively resetting either and both said transfluxor and further core.

9. A detector device comprising a magnetic core having aperture means therein defining a reference section having a first cross-sectional area, and also defining a further section having a cross-sectional area substantially twice that of said reference section, a transistor biased to be normally conductive, first winding means coupling said transistor to both said sections in a first magnetic sense respectively whereby the normal transistor current operates to effect flux in first relative directions in said sections, second winding means coupling a control electrode of said transistor to both said sections in a second magnetic sense opposite to said first magnetic sense, whereby a change in said normal transistor current effects a flux change in said core inducing a voltage in said second winding means tending to maintain said change in transistor current until stable relative flux directions different from said first directions are effected in said sections, bias winding means coupled to said core adjacent said first section only for producing a magnetomotive force different in magnitude from and in a sense opposite to the magnetomotive force produced adjacent said first section by said first winding means, input signal means for selectively increasing and selectively decreasing said normal transistor current whereby the relative flux directions in said sections may be selectively switched into either of two different stable flux directions which differ from one another as well as from said first relative directions, means for selectively resetting said sections to their first relative flux directions subsequent to operation of said input means, and output winding means coupled to a preselected portion only of said core for producing an output signal only when said core is reset from a particular one of said two different stable flux direction states.

10. A detector device comprising a transfluxor having first, second, and third legs, said second leg having a cross-sectional area substantially equal to said first leg, and said third leg having a cross-sectional area substantially twice that of said first leg, a controllable current source, first winding means coupling said source to both said first and third legs whereby the normal current output of said source operates to effect flux in first relative directions in said first, second, and third legs, means for controlling the output of said source comprising second winding means coupling said first and third legs to said source in a magnetic sense wherein a change in said normal current output of said source effects a flux change through said second winding means inducing a voltage in said second winding means of a polarity proper to maintain said current output change until new stable relative flux directions different from said first directions are effected in two of said first, second, and third legs, and input means for coupling control signals to said controllable current source for selectively initiating a change in the output current of said source.

11. The device of claim 10 wherein said controllable current source comprises a transistor having its base coupled to said second winding means and having one of its other electrodes coupled to said first winding means.

12. A detector device comprising a transfluxor having a pair of spaced apertures defining first, second, and third legs, a current source having a controllable output, first winding means coupling said source to both said pair of spaced apertures in a first magnetic sense respectively to effect a quiescent flux state in first relative directions in said first, second, and third legs, second winding means for controlling the output of said current source, said second winding means being coupled to both said pair of spaced apertures in a second magnetic sense respectively opposite to said first magnetic sense, whereby a change in the output current of said source effects a flux change in said second winding means tending to maintain said output current change, bias winding means coupled to said transfluxor adjacent one only of said apertures for producing a magnetomotive force about said one aperture in a sense opposite to the magnetomotive force produced adjacent said one aperture by said first winding means whereby the magnetomotive force produced by said first winding means adjacent said one aperture predominates when the current output of said source changes in a first sense and the magnetomotive force produced by said bias winding means adjacent said one aperture predominates when the current output of said source changes in a second opposite sense, and input signal means for initiating a change in the output current of said source in either of said two senses thereby to selectively alter the relative flux directions in said legs into either of two different stable flux directions which differ from one another as well as from said first relative directions.

13. The device of claim 12 including means for sensing which of said two different stable flux states has been established in said legs subsequent to receipt of a signal from said input signal means.

14. The device of claim 12 wherein said input signal means includes a Search memory operative to produce a signal of first sense when a search criterion is met, and operative to produce a signal of opposite sense when a search criterion is not met.

References Cited

UNITED STATES PATENTS 3,117,308 1/1964 Sublette ------------ 340—174

BERNARD KONICK, *Primary Examiner.*

R. F. CARDILLO, *Examiner.*